(12) United States Patent
Oh

(10) Patent No.: US 9,815,370 B2
(45) Date of Patent: Nov. 14, 2017

(54) VEHICLE AND CONTROL METHOD THEREOF

(71) Applicant: HYUNDAI MOTOR COMPANY, Seoul (KR)

(72) Inventor: Seok Min Oh, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 55 days.

(21) Appl. No.: 14/952,182

(22) Filed: Nov. 25, 2015

(65) Prior Publication Data
US 2017/0072797 A1 Mar. 16, 2017

(30) Foreign Application Priority Data
Sep. 14, 2015 (KR) .................. 10-2015-0129484

(51) Int. Cl.
*B60R 1/12* (2006.01)
*B60K 35/00* (2006.01)
*B60R 1/04* (2006.01)

(52) U.S. Cl.
CPC ............ *B60K 35/00* (2013.01); *B60R 1/04* (2013.01); *B60K 2350/927* (2013.01); *B60R 2001/1215* (2013.01); *B60R 2001/1253* (2013.01); *B60R 2300/70* (2013.01)

(58) Field of Classification Search
CPC ..... B60R 1/02; B60R 1/12; B60R 2001/1215; B60R 2001/1253; G02B 5/0816; G02B 2027/0138; G02B 2027/0154
USPC ............ 701/36, 487; 359/245, 632; 362/494
See application file for complete search history.

(56) References Cited

U.S. PATENT DOCUMENTS

| 7,224,324 B2 * | 5/2007 | Quist ................. B60R 1/12 178/18.06 |
| 2012/0229645 A1 * | 9/2012 | Yamada ............... B60Q 1/2665 348/148 |
| 2014/0121899 A1 * | 5/2014 | Sung ..................... B60R 1/00 701/36 |

FOREIGN PATENT DOCUMENTS

| JP | 2004-182156 A | 7/2004 |
| JP | 2009-090827 A | 4/2009 |
| KR | 10-0203765 B1 | 6/1999 |
| KR | 10-2002-0030624 A | 4/2002 |
| KR | 2002-0079310 A | 10/2002 |
| KR | 10-0389380 B1 | 6/2003 |
| KR | 10-2008-0034528 A | 4/2008 |
| KR | 10-2011-0039074 A | 4/2011 |
| KR | 10-1262906 B1 | 5/2013 |

* cited by examiner

*Primary Examiner* — Dalena Tran
(74) *Attorney, Agent, or Firm* — McDermott Will & Emery LLP

(57) ABSTRACT

A vehicle includes a room mirror provided to be rotatable and providing a display mode, and a memory for storing an image capable of being displayed on the room mirror in the display mode, wherein, when the room mirror is rotated toward a front glass, the room mirror is converted into the display mode and displays the image stored in the memory.

19 Claims, 7 Drawing Sheets

VEHICLE AND CONTROL METHOD THEREOF

CROSS-REFERENCE TO RELATED APPLICATION

This application claims the benefit of priority to Korean Patent Application No. 10-2015-0129484, filed on Sep. 14, 2015 in the Korean Intellectual Property Office, the disclosure of which is incorporated herein by reference.

TECHNICAL FIELD

Embodiments of the present disclosure relate to a vehicle and a control method thereof.

BACKGROUND

In general, there are many cases in which various stickers or tags, such as a driver's mobile phone number, a parking permit, a pass and a handicapped identity card, are attached on a front glass of a vehicle.

Such stickers or tags may serve as obstacles which obstruct a driver's field of vision. Therefore, it is necessary to develop a technique which is able to perform the same function without attaching the stickers or the tags to the vehicle.

SUMMARY OF THE DISCLOSURE

Therefore, it is an aspect of the present disclosure to provide a vehicle which displays an image of a parking permit, a pass, a handicapped identity card or the like through a room mirror providing a display mode, and a control method thereof.

Additional aspects of the disclosure will be set forth in part in the description which follows and, in part, will be obvious from the description, or may be learned by practice of the disclosure.

In accordance with one aspect of the present disclosure, a vehicle includes a room mirror provided to be rotatable and configured to provide a display mode; and a memory configured to store an image capable of being displayed on the room mirror in the display mode, wherein, when the room mirror is rotated toward a front glass, the room mirror is converted into the display mode, and displays the image stored in the memory.

The vehicle may further include a rear camera configured to obtain a rear image of the vehicle, and when a shift lever is moved to an R (reverse) position, the room mirror may be converted into the display mode, and may display the rear image of the vehicle obtained by the rear camera.

When an engine of the vehicle is turned off, the room mirror may be converted into a mirror mode.

When an engine of the vehicle is turned off, the room mirror may be rotated toward the front glass, and may be converted into the display mode.

When an engine of the vehicle is turned on, the room mirror may be rotated toward a rear glass, and may be converted into a mirror mode.

The vehicle may further include an input unit configured to receive an input of a command for rotating the room mirror toward the front glass or a rear glass.

The vehicle may further include a communicator configured to receive an image transmitted from a wireless communication terminal, and the memory may store an image received by the communicator.

The room mirror may be provided to be rotatable in a yaw direction.

The vehicle may further include a controller configured to convert the room mirror into the display mode and to display the image stored in the memory on the room mirror, when the room mirror is rotated toward the front glass at a predetermined angle or more.

The controller may convert the room mirror into a mirror mode, when the room mirror is rotated toward a rear glass at the predetermined angle or more.

The room mirror may include a motor configured to provide power so that the room mirror is rotated in a yaw direction.

In accordance with another aspect of the present disclosure, a method of controlling a vehicle includes converting a room mirror into a display mode and displaying a rear image of the vehicle on the room mirror, when a shift lever is moved to an R (reverse) position; converting the room mirror into the display mode, when the room mirror is rotated toward a front glass; and displaying a predetermined image on the room mirror which is converted into the display mode.

The method may further include rotating the room mirror toward a rear glass, when an engine of the vehicle is turned on; and converting the room mirror into a mirror mode, when the room mirror is rotated toward the rear glass.

The method may include determining whether the room mirror is rotated toward a rear glass at a predetermined angle or more, when an engine of the vehicle is turned on; and converting the room mirror into a mirror mode, when the room mirror is rotated at the predetermined angle or more.

The method may further include rotating the room mirror toward a rear glass, when a command for rotating the room mirror toward the rear glass is input through an input unit; and converting the room mirror into a mirror mode.

The method may further include rotating the room mirror toward the front glass, when an engine of the vehicle is turned off; and converting the room mirror into the display mode, when the room mirror is rotated toward the front glass.

The method may include determining whether the room mirror is rotated toward the front glass at a predetermined angle or more, when an engine of the vehicle is turned off; and converting the room mirror into the display mode, when the room mirror is rotated at the predetermined angle or more.

The method may further include rotating the room mirror toward the front glass, when a command for rotating the room mirror toward the front glass is input through an input unit; and converting the room mirror into the display mode.

The converting of the room mirror into the display mode may include converting the room mirror into a mirror mode, when an engine of the vehicle is turned off; and converting the room mirror into the display mode, when the room mirror is rotated toward the front glass.

The display of the image may include receiving an image transmitted from a wireless communication terminal; and displaying the received image on the room mirror which is converted into the display mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, exemplary embodiments of a vehicle and a control method thereof according to one aspect of the present disclosure will be described in detail with reference to the accompanying drawings.

Figure 1:
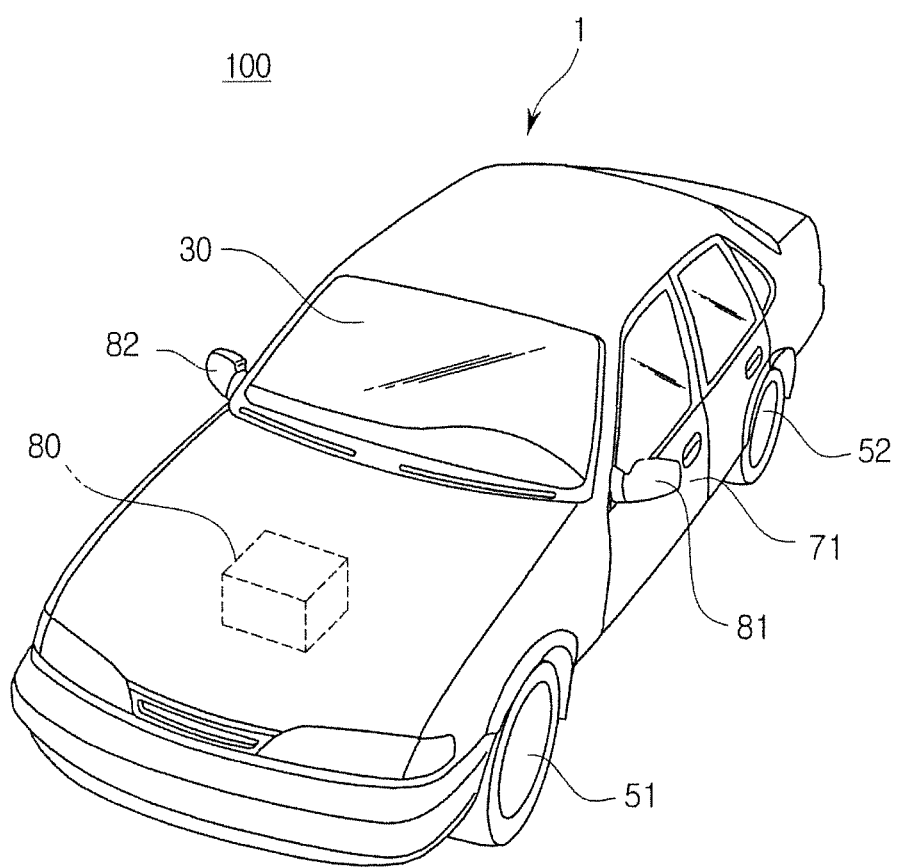
FIG. 1 is a view of an external appearance of a vehicle according to one embodiment of the present disclosure.
Figure 2:
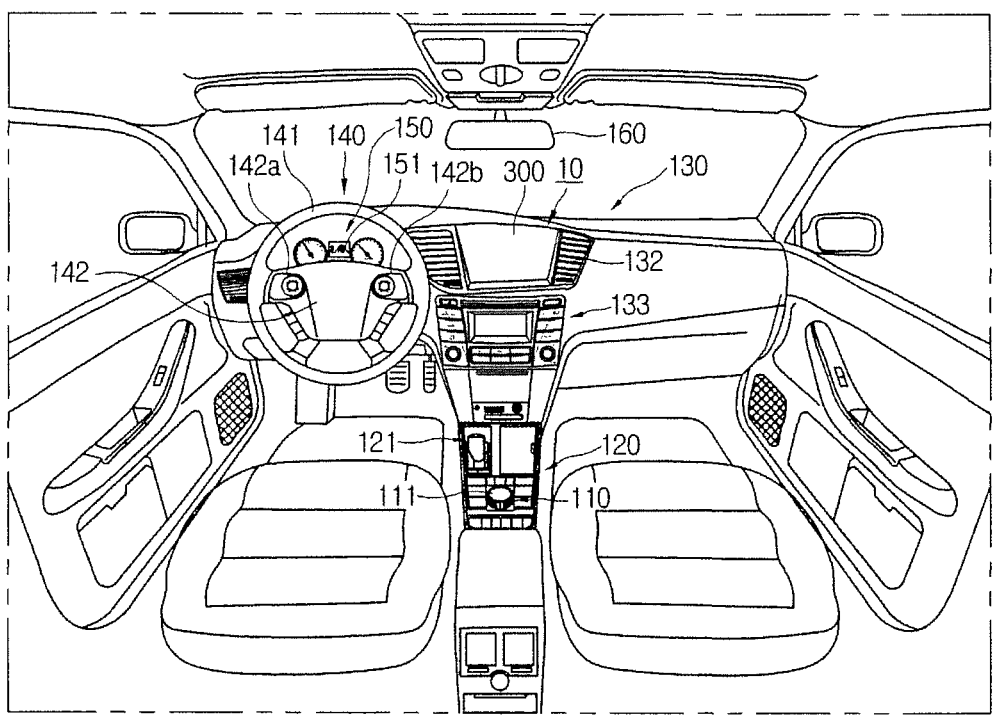
FIG. 2 is a view illustrating an internal structure of the vehicle according to one embodiment of the present disclosure.

FIG. 1 is a view of an external appearance of a vehicle according to one embodiment of the present disclosure, and FIG. 2 is a view illustrating an internal structure of the vehicle according to one embodiment of the present disclosure.

Referring to FIG. 1, a vehicle 100 according to one embodiment of the present disclosure may include a main body 1 which forms an external shape of the vehicle 100, wheels 51 and 52 which moves the vehicle 100, a driving unit 80 which rotates the wheels 51 and 52, doors 71 which close an inside of the vehicle 100 from an outside, a front glass 30 which provides a driver in the vehicle 100 with a field of vision of a front of the vehicle 100, and side mirrors 81 and 82 which provide the driver with a field of vision of a rear of the vehicle 100.

The wheels 51 and 52 include a front wheel 51 which is provided at a front of the vehicle 100, and a rear wheel 52 which is provided at a rear of the vehicle 100.

The driving unit 80 serves to provide a rotational force to the front wheel 51 or the rear wheel 52 so that the main body 1 is moved forward or backward. The driving unit 80 may include an engine which burns a fossil fuel and generates the rotational force, or a motor which receives power from an electric condenser (not shown) and generates the rotational force.

The doors 71 are each rotatably provided at left and right sides of the main body 1 to enable the driver to get into the vehicle 100, when the door 71 is opened, and also to close the inside of the vehicle 100 from the outside, when the door 71 is closed.

The front glass 30 which is referred to as a windshield glass is provided at an upper front side of the main body 100. The driver in the vehicle 100 may see a front of the vehicle 100 through the front glass 30. Also, the side mirrors 81 and 82 include a left side mirror 81 which is provided at a left side of the main body 1, and a right side mirror 82 which is provided at a right side of the main body 1. The driver in the vehicle 100 may visually check side and rear situations of the vehicle 100 through the side mirrors 81 and 82.

Further, the vehicle 100 may include various sensors which detect obstacles around the vehicle 100 and assist the driver in recognizing situations around the vehicle 100. Also, the vehicle 100 may include various sensors which can detect driving information of the vehicle 100, such as a speed of the vehicle. Also, the vehicle 100 may include a sensor which obtains an image of a surrounding environment including a traffic lane. The various sensors which can detect the driving information of the vehicle 100 or the situations around the vehicle 100 will be described below.

Referring to FIG. 2, the vehicle 100 may include a dashboard at which a gear box 120, a center fascia 130, a steering wheel 140 and an instrument panel 150 are provided.

A gear lever 121 for shifting gears may be installed at the gear box 120. Also, as shown in the drawings, an input unit 110 including a dial controller 111 and various buttons which are provided to enable a user to control main functions of the vehicles 100 or functions of a multimedia device including a navigation device 10 and an audio device 133 may be installed at the gear box.

An air conditioning device 132, the audio device 133 and the navigation device 10 may be installed at the center fascia 130.

The air conditioning device 132 may control temperature, humidity, purity of air and a flow of air in the vehicle 100, and comfortably maintains the inside of the vehicle 100. The air conditioning device 132 may include at least one outlet port which is installed at the center fascia 130 to discharge the air. A button or a dial for controlling the air conditioning device or the like may be installed at the center fascia 130. The user or the driver may control the air conditioning device of the vehicle 100 using the button or the dial disposed at the center fascia 130. Of course, the air conditioning device 132 may be controlled through the buttons or the dial controller 111 of the input unit 110 installed at the gear box 120.

In some embodiments, the navigation device 10 may be installed at the center fascia 130. The navigation device 10 may be formed to be located in the center fascia 130 of the vehicle 100. According to one embodiment, an input unit for controlling the navigation device 10 may be installed at the center fascia 130. In some embodiments, the input unit of the navigation device 10 may be installed at another position rather than the center fascia 130. For example, the input unit of the navigation device 10 may be installed around a display 300 of the navigation device 10. As another example, the input unit of the navigation device 10 may be installed at the gear box 120 or the like.

The steering wheel 140 is a device for control a driving direction of the vehicle 100, and may include a rim 141 which is gripped by the driver, and a spoke 142 which is connected with a steering system of the vehicle 100 and also connects the rim 141 with a hub of a rotating shaft for steering the vehicle 100. In some embodiments, operation units 142a and 142b for controlling various devices, e.g., the audio device or the like in the vehicle 100 may be provided at the spoke 142. Also, the instrument panel 150, which may indicate a driving speed of the vehicle 100, an engine RPM, fuel quantity or the like may be installed at the dashboard. The instrument panel 150 may include an instrument panel display 151 which displays vehicle conditions, information related to vehicle driving, information related to an operation of the multimedia device or the like.

The driver may operate the above-described various devices provided at the dashboard, and may drive the vehicle 100. As illustrated in FIG. 2, in addition to the devices which are operated by the driver for the driving of the vehicle 100, the vehicle 100 may have various sensors which detect outside information of the vehicle 100 or driving information of the vehicle 100 required for the driving of the vehicle 100.

Also, a room mirror 160 is provided at an inside of the vehicle 100 to enable the driver to check rear situations of the vehicle 100. The room mirror 160 according to the embodiment may be provided to be rotatable at 360° in a yaw direction. Therefore, the room mirror 160 may face the rear of the vehicle 100, as illustrated in FIG. 2, and may be rotated toward the front glass to face the front glass of the vehicle 100, contrary to FIG. 2. In this case, when the front glass is seen from the outside of the vehicle 100, a mirror part of the room mirror 160 may be seen. The user may directly apply a force to the room mirror 160 and may rotate the room mirror 160 in a desired direction. Alternatively, the room mirror 160 may include a motor which provides power for rotating the room mirror 160, and thus may be rotated by driving of the motor according to an internal input. The room mirror 160 may include an encoder which can detect a rotational angle and direction of the room mirror 160, and the encoder may be integrally formed with the motor.

Also, the room mirror 160 according to the embodiment provides not only its original function as a mirror but also a display function which may display an image. For example, the room mirror 160 may provide a display mode in predetermined situations that the vehicle 100 is being moved backward or parked, and may provide a mirror mode in situations other than the predetermined situations.

The room mirror 160 may be formed so that a reflective layer like the mirror and a reflective display stacked thereon are coupled to each other to provide the mirror mode and the display mode. A cholesteric liquid crystal may be used as the reflective display. The cholesteric liquid crystal enables light to be transmitted in a homeotropic state or to be reflected in a planar state. Therefore, when a state of the cholesteric liquid crystal is converted into the homeotropic state, the room mirror 160 may provide the mirror mode, and when the state of the cholesteric liquid crystal is converted into the planar state, the room mirror 160 may display a predetermined image. The room mirror 160 according to the embodiment is not limited to using of the reflective display including the cholesteric liquid crystal, and may use various well known techniques which allow conversion between the mirror function and the display functions. Also, the room mirror 160 may include a touch screen, and thus may receive a command through a predetermined touch gesture.

The room mirror 160 according to the embodiment may remove obstacles which obstruct a driver's field of vision by displaying an image of a sticker or a tag, such as a parking permit, a pass, a driver's mobile phone number and a handicapped identity card, which is attached on the front glass. Hereinafter, this will be described more specifically.

Figure 3:
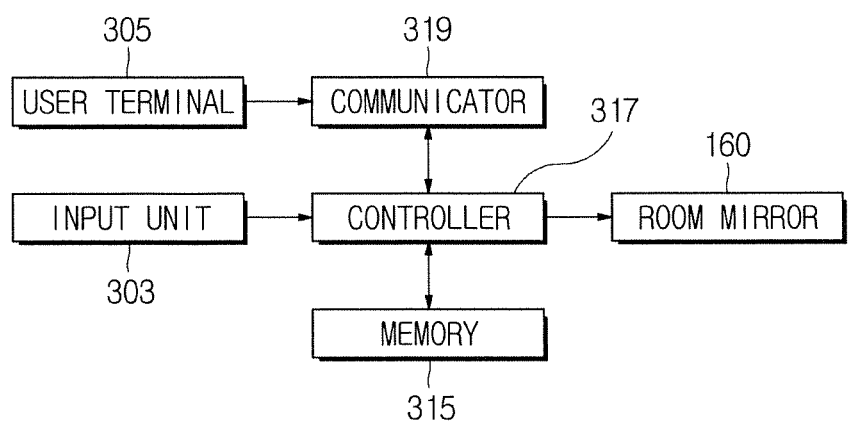
FIG. 3 is a control block diagram of the vehicle according to one embodiment of the present disclosure.
Figure 4:
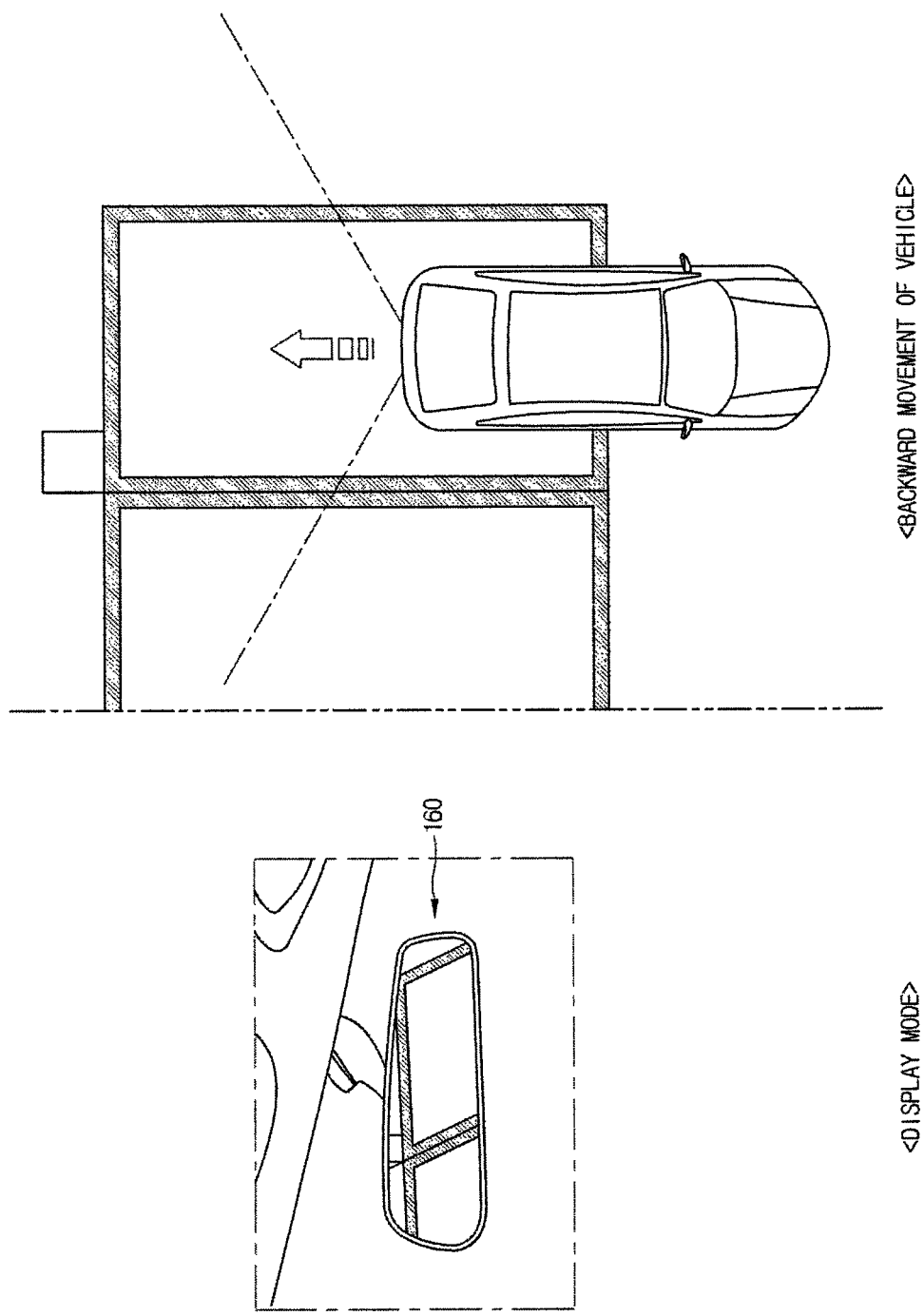
FIG. 4 is a view illustrating one example of a display mode of a room mirror in the vehicle according to one embodiment of the present disclosure.
Figure 5:
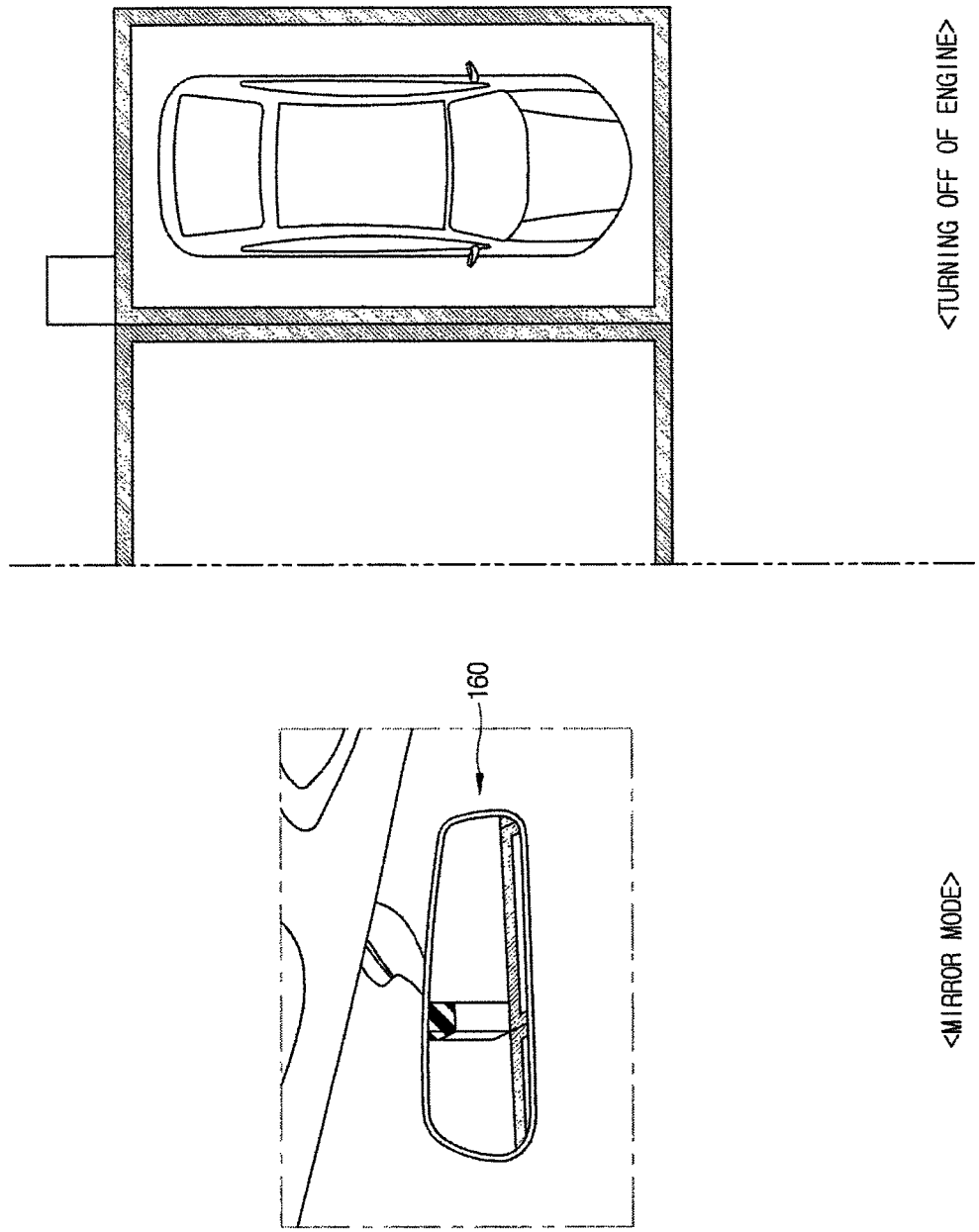
FIG. 5 is a view illustrating a mirror mode of the room mirror in the vehicle according to one embodiment of the present disclosure.
Figure 6:
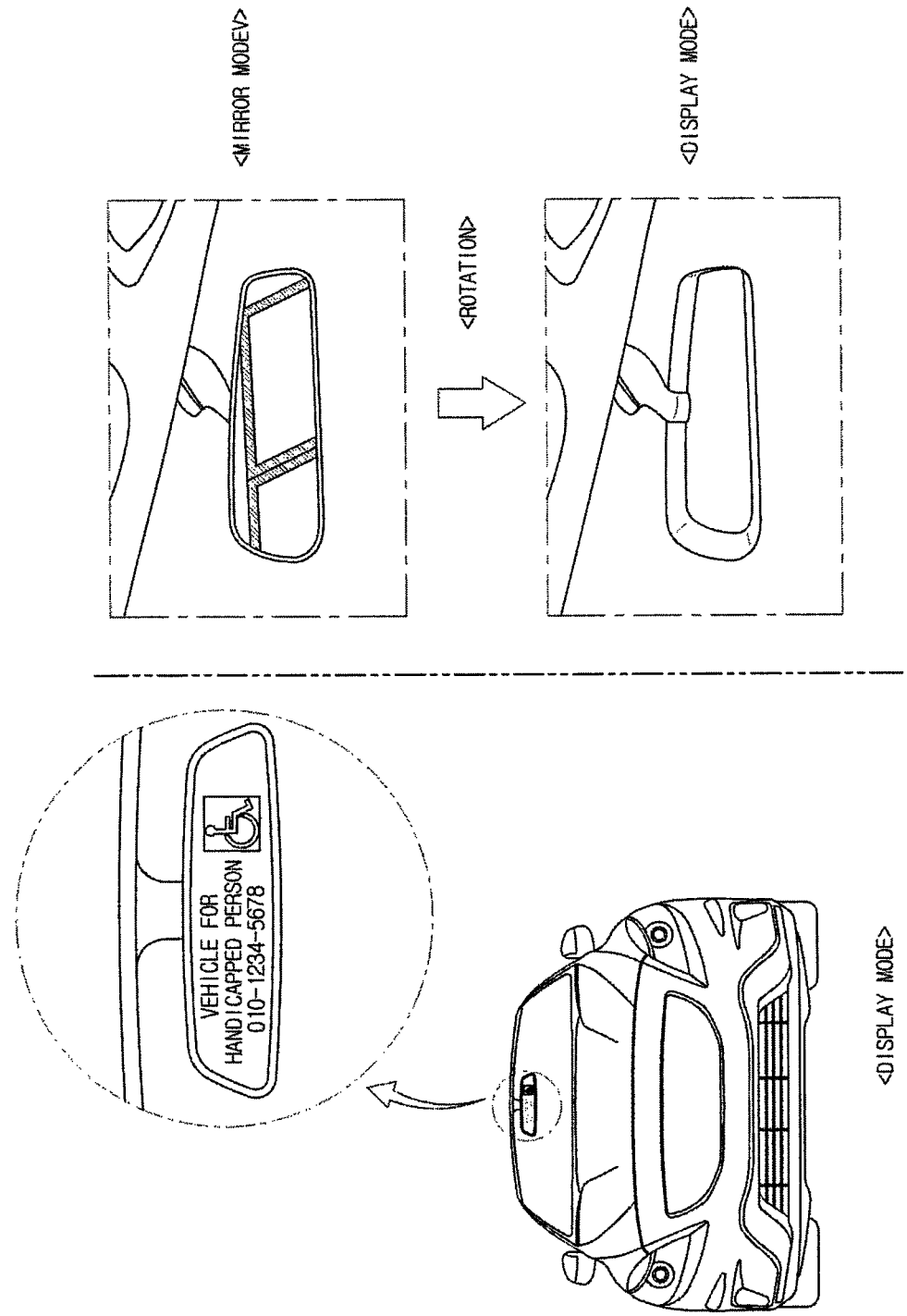
FIG. 6 is a view illustrating another example of the display mode of the room mirror in the vehicle according to one embodiment of the present disclosure.

FIG. 3 is a control block diagram of the vehicle according to one embodiment of the present disclosure, FIG. 4 is a view illustrating one example of the display mode of the room mirror 160 in the vehicle according to one embodiment of the present disclosure, and FIG. 5 is a view illustrating the mirror mode of the room mirror 160 in the vehicle according to one embodiment of the present disclosure. FIG. 6 is a view illustrating another example of the display mode of the room mirror 160 in the vehicle according to one embodiment of the present disclosure.

As illustrated in FIG. 3, the vehicle 100 according to the embodiment may include an input unit 303 which receives an input related to rotational drive of the room mirror 160, a communicator 319 which receives an image from a user terminal 305, such as a smart phone and a tablet computer, which provides a wireless communication function, a controller 317 which outputs a control signal for rotating the room mirror 160 and displays the image received by the communicator 319 on the room mirror 160, the room mirror 160 which is provided to be rotatable and provides the mirror mode and the display mode, and a memory 315 which stores the image received from the user terminal 305.

The input unit 303 may be provided to receive an input for rotating the room mirror 160 toward a rear glass or the front glass. The input unit 303 may be provided at the center fascia, the gear box or the steering wheel, and may be formed in various types such as a hard key or soft key type button, a toggle switch, a dial, an audio recognition unit and a motion recognition unit. When the command for rotating the room mirror 160 is input through the input unit 303, the controller 317 may output the control signal for rotating the room mirror 160 to the motor included in the room mirror 160. As described above, the user may rotate the room mirror 160 by inputting the command for rotating the room mirror 160 through the input unit 303, and may rotate the room mirror 160 in the desired directions by directly applying the force to the room mirror 160.

The memory 315 may store various images which are displayed on the room mirror 160 in the display mode. As described above, the memory 315 may store the images of the pass, the parking permit, the handicapped identity card and the driver's mobile phone number or the like. These images may be transmitted from the user terminal 305 like the smart phone which supports the communication function. That is, the user may capture an image to be displayed on the room mirror 160, e.g., the image of a camera of the smart phone, may transmit the image to the communicator 319 of the vehicle 100, and then may store the image in the memory 315.

The communicator 319 may receive a wireless signal including image data transmitted from the user terminal 305 through a communication method such as 3 generation (3G), 4 generation (4G) and 5 generation (5G). Also, the communicator 319 may receive the wireless signal including the image data transmitted from the user terminal 305 within a desired distance through a communication method such as wireless LAN, Wi-Fi, Bluetooth, zigbee, Wi-Fi direct (WFD), ultra wideband (UWB), infrared data association (IrDA), Bluetooth low energy (BLE) and near field communication (NFC).

When there is an image which is stored in the memory 315 in advance, the controller 317 may display the image on the room mirror 160 in the display mode, and when there is not an image which is stored in the memory 315 in advance, the controller 317 may directly display an image received by the communicator 319 on the room mirror 160 in the display mode. When a plurality of images are stored in the memory 315, the images may be classified into images necessary while the vehicle 100 is parked and images necessary while the vehicle 100 is being driven, and may be displayed. For example, in the case of a building pass, only when the pass is recognized from an outside while the vehicle 100 is being driven, the vehicle 100 may enter a corresponding building. Therefore, when the room mirror 160 is rotated toward the front glass in a state in which the vehicle 100 is being driven, the room mirror 160 may display an image of the building pass among the plurality of images stored in the memory 315, and when the room mirror 160 is rotated toward the front glass in a state in which the vehicle 100 is parked, the room mirror 160 may display an image of the driver's mobile phone number or the handicapped identity card among the plurality of images stored in the memory 315.

Even when there is an image stored in the memory 315 in advance, the image directly transmitted from the user terminal 305 may be displayed on the room mirror 160 in the display mode. In the case in which an image is transmitted from the user terminal 305 while there is an image stored in the memory 315 in advance, when the image transmitted from the user terminal 305 is different from the image stored in the memory 315, the controller 317 may display the image transmitted from the user terminal 305 on the room mirror 160 in the display mode. That is, in preference to the image stored in the memory 315, the image transmitted from the user terminal 305 may be displayed on the room mirror 160 in the display mode.

Alternatively, in the case in which the image displayed on the room mirror 160 is not a desired image while the plurality of images are stored in the memory 315, the user may change the image displayed on the room mirror 160 into another image through a separate input unit, and may enable the desired image to be displayed on the room mirror 160. To change the image displayed on the room mirror 160, the separate input unit may be provided, or the input unit 303 which receives the command for rotating the room mirror 160 may be also formed to receive an input for changing the image. Also, the user may input a command for changing the image displayed on the room mirror 160 through the user terminal 305, instead of the input unit. In this case, an application which provides various functions related to the displaying of the image on the room mirror 160 may be installed at the user terminal 305. Alternatively, the user may directly touch the room mirror 160 with a predetermined touch gesture, and may change the image displayed on the room mirror 160 in the display mode.

Hereinafter, the display mode of the room mirror 160 will be described more specifically.

As illustrated in FIG. 4, when a shift lever is moved to an R (reverse) position, and the vehicle 100 is moved backward, the room mirror 160 may be converted from the mirror mode to the display mode. That is, the controller 317 is interlocked with the movement of the shift lever to the R position, and converts the room mirror 160 from the mirror mode into the display mode. When the shift lever is moved from the R position, the controller 317 may convert again the room mirror 160 into the mirror mode.

While the vehicle is being moved backward, the controller 317 enables an image obtained from a rear camera of the vehicle 100 to be displayed on the room mirror 160 which is converted into the display mode, as illustrated in FIG. 4. The driver may check the rear situation of the vehicle 100 through the room mirror 160, and may perform parking or the like of the vehicle 100.

When the parking is completed, and then an engine is turned off, the controller 317 may convert again the room mirror 160 into the mirror mode, as illustrated in FIG. 5.

As illustrated in FIG. 6, when the driver rotates the room mirror 160 toward the front glass after the engine of the vehicle 100 is turned off, the controller 317 may convert the room mirror 160 into the display mode. When the rotational direction of the room mirror 160 is directed toward the front glass, and the rotational angle thereof is greater than a predetermined angle, the controller 317 may convert the room mirror 160 from the mirror mode into the display mode. The controller 317 may display the image stored in the memory 315 on the room mirror 160, while converting the room mirror 160 into the display mode. Alternatively, the image transmitted from the user terminal 305 may be directly displayed on the room mirror 160. A method of determining the image displayed on the room mirror 160 among the image stored in the memory 315 and the image transmitted from the user terminal 305 is the same as the above-described method, and thus description thereof will be omitted. As illustrated in FIG. 6, the handicapped identity card may be displayed on the room mirror 160 in the display mode, and may be checked from the outside of the vehicle 100 through the front glass.

As another example, the controller 317 may be interlocked with turning off of the engine of the vehicle 100, and may rotate the room mirror 160 toward the front glass. The controller 317 may output a control signal for driving the motor of the room mirror 160 to rotate the room mirror 160 toward the front glass of the vehicle 100. The controller 317 may rotate the room mirror 160 toward the front glass, and may convert the room mirror 160 into the display mode. When the rotational direction of the room mirror 160 is directed toward the front glass, and the rotational angle thereof is greater than the predetermined angle, the controller 317 may convert the room mirror 160 from the mirror mode into the display mode. The controller 317 may display the image stored in the memory 315 on the room mirror 160, while converting the room mirror 160 into the display mode. Alternatively, the image transmitted from the user terminal 305 may be directly displayed on the room mirror 160. The method of determining the image displayed on the room mirror 160 among the image stored in the memory 315 and the image transmitted from the user terminal 305 is the same as the above-described method, and thus a description thereof will be omitted. As illustrated in FIG. 6, the handicapped identity card may be displayed on the room mirror 160 in the display mode, and may be checked from the outside of the vehicle 100 through the front glass.

As still another example, when the driver inputs the command for rotating the room mirror 160 toward the front glass through the input unit 303, the controller 317 may rotate the room mirror 160 toward the front glass. The controller 317 may output the control signal for driving the motor of the room mirror 160 to rotate the room mirror 160 toward the front glass of the vehicle 100 according to the rotating command input through the input unit 303. The controller 317 may rotate the room mirror 160 toward the front glass, and may convert the room mirror 160 into the display mode. When the rotational direction of the room mirror 160 is directed toward the front glass, and the rotational angle thereof is greater than the predetermined angle, the controller 317 may convert the room mirror 160 from the mirror mode into the display mode. The controller 317 may display the image stored in the memory 315 on the room mirror 160, while converting the room mirror 160 into the display mode. Alternatively, the image transmitted from the user terminal 305 may be directly displayed on the room mirror 160. The method of determining the image displayed on the room mirror 160 among the image stored in the memory 315 and the image transmitted from the user terminal 305 is the same as the above-described method, and thus a description thereof will be omitted. As illustrated in FIG. 6, the handicapped identity card may be displayed on the room mirror 160 in the display mode, and may be checked from the outside of the vehicle 100 through the front glass.

Meanwhile, as described above, an image of the sticker or tag like the building pass which may be checked from the outside of the vehicle 100, while the vehicle is being driven, may be displayed on the room mirror 160 in a state in which the engine of the vehicle 100 is turned on. Therefore, when the driver directly rotates the room mirror 160 toward the front glass, or inputs the command for rotating the room mirror 160 toward the front glass through the input unit 303, the controller 317 displays the image of the building pass or the like, which should be checked in the state in which the vehicle is being driven, among the other images stored in the memory 315, while converting the room mirror 160 into the display mode. When the driver directly rotates the room mirror 160 toward the rear glass, or inputs the command for rotating the room mirror 160 toward the rear glass through the input unit 303, the controller 317 converts again the room mirror 160 into the mirror mode.

When the engine of the vehicle 100 is turned on, the room mirror 160 may be rotated toward the rear glass, and may be converted into the mirror mode. Hereinafter, this will be described specifically.

When the driver rotates the room mirror 160 toward the rear glass after the engine of the vehicle 100 is turned on, the controller 317 may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

As another example, the controller 317 may be interlocked with turning on of the engine of the vehicle 100, and may rotate the room mirror 160 toward the rear glass. The controller 317 may output the control signal for driving the motor of the room mirror 160 to rotate the room mirror 160 toward the rear glass of the vehicle 100. The controller 317 may rotate the room mirror 160 toward the rear glass, and may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

As still another example, when the driver inputs the command for rotating the room mirror 160 toward the rear glass through the input unit 303, the controller 317 may rotate the room mirror 160 toward the rear glass. The controller 317 may output the control signal for driving the motor of the room mirror 160 to rotate the room mirror 160 toward the rear glass of the vehicle 100 according to the rotating command input through the input unit 303. The controller 317 may rotate the room mirror 160 toward the rear glass, and may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

Figure 7:
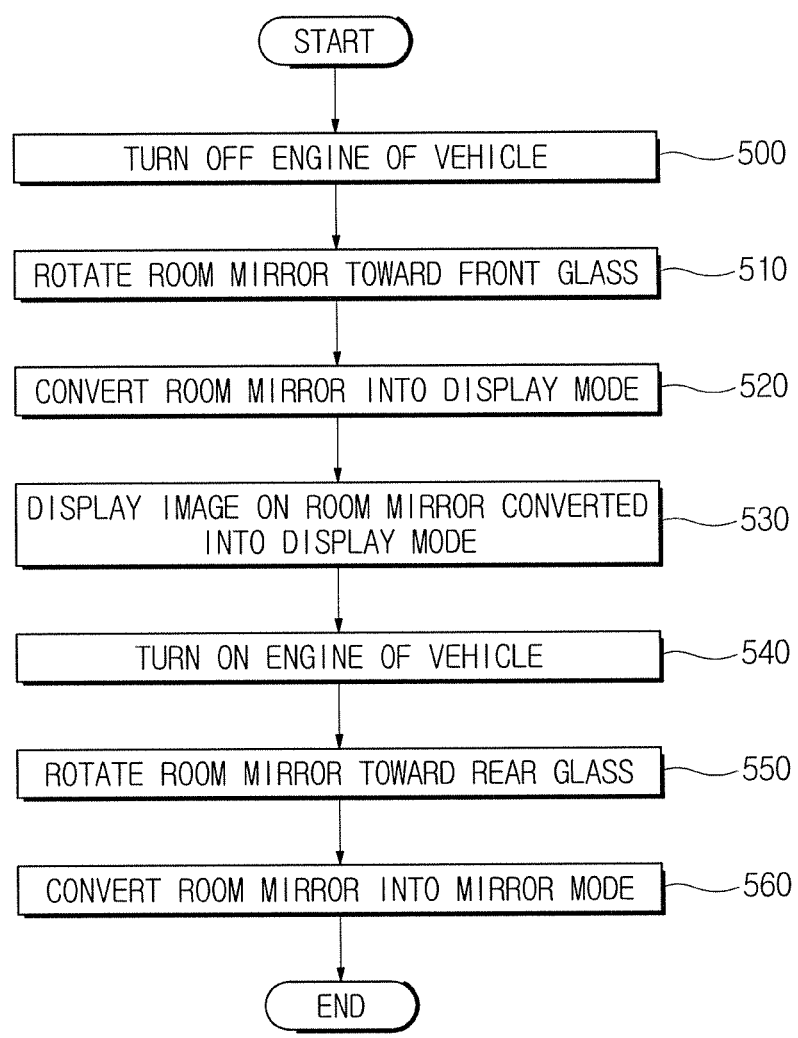
FIG. 7 is a flowchart illustrating a control method of the vehicle according to one embodiment of the present disclosure.

FIG. 7 is a flowchart illustrating a control method of the vehicle according to one embodiment of the present disclosure.

As illustrated in FIG. 7, when the engine of the vehicle 100 is turned off (500), and the room mirror 160 is rotated toward the front glass (510), the room mirror 160 is converted into the display mode (520).

As illustrated in FIG. 6, when the driver rotates the room mirror 160 toward the front glass after the engine of the vehicle 100 is turned off, the controller 317 may convert the room mirror 160 into the display mode. When the rotational direction of the room mirror 160 is directed toward the front glass, and the rotational angle thereof is greater than the predetermined angle, the controller 317 may convert the room mirror 160 from the mirror mode into the display mode.

As another example, the controller 317 may be interlocked with turning off of the engine of the vehicle 100, and may rotate the room mirror 160 toward the front glass. The controller 317 may output the control signal for driving the motor of the room mirror 160 to rotate the room mirror 160 toward the front glass of the vehicle 100. The controller 317 may rotate the room mirror 160 toward the front glass, and may convert the room mirror 160 into the display mode. When the rotational direction of the room mirror 160 is directed toward the front glass, and the rotational angle thereof is greater than the predetermined angle, the controller 317 may convert the room mirror 160 from the mirror mode into the display mode.

As still another example, when the driver inputs the command for rotating the room mirror 160 toward the front glass through the input unit 303, the controller 317 may rotate the room mirror 160 toward the front glass. The controller 317 may output the control signal for driving the motor of the room mirror 160 to rotate the room mirror 160 toward the front glass of the vehicle 100 according to the rotating command input through the input unit 303. The controller 317 may rotate the room mirror 160 toward the front glass, and may convert the room mirror 160 into the display mode. When the rotational direction of the room mirror 160 is directed toward the front glass, and the rotational angle thereof is greater than the predetermined angle, the controller 317 may convert the room mirror 160 from the mirror mode into the display mode.

The controller 317 displays the image on the room mirror 160 which is converted into the display mode (530).

When an image is stored in the memory 315 in advance, the controller 317 may display the corresponding image on the room mirror 160 in the display mode. The memory 315 may store various images which are displayed on the room mirror 160 in the display mode. As described above, the memory 315 may store the images of the pass, the parking permit, the handicapped identity card and the driver's mobile phone number or the like. These images may be transmitted from the user terminal 305, such as the smart phone which supports the communication function. That is, the user may capture an image to be displayed on the room mirror 160, e.g., with the image of camera of the smart phone, may transmit the image to the communicator 319 of the vehicle 100, and then may store the image in the memory 315.

When there is not an image stored in the memory 315 in advance, the controller 317 may directly display the image received by the communicator 319 on the room mirror 160 in the display mode. Of course, even when there is an image stored in the memory 315 in advance, the image directly transmitted from the user terminal 305 may be displayed on the room mirror 160 in the display mode. In the case in which an image is transmitted from the user terminal 305 while there is the image stored in the memory 315 in advance, when the image transmitted from the user terminal 305 is different from the image stored in the memory 315, the image transmitted from the user terminal 305 may be displayed on the room mirror 160 in the display mode. That is, in preference to the image stored in the memory 315, the image transmitted from the user terminal 305 may be displayed on the room mirror 160 in the display mode.

Alternatively, in the case in which the image displayed on the room mirror 160 is not the desired image while a plurality of images are stored in the memory 315, the user may change the image displayed on the room mirror 160 into another image through the separate input unit, and may enable the desired image to be displayed on the room mirror

160. To change the image displayed on the room mirror 160, the separate input unit may be provided, or the input unit 303 which receives the command for rotating the room mirror 160 may be also formed to receive the input for changing the image. Also, the user may input the command for changing the image displayed on the room mirror 160 through the user terminal 305, instead of the input unit. In this case, the application which provides various functions related to the displaying of the image on the room mirror 160 may be installed at the user terminal 305. Alternatively, the user may directly touch the room mirror with the predetermined touch gesture, and may change the image displayed on the room mirror 160 in the display mode.

When the engine of the vehicle 100 is turned on (540), and the room mirror 160 is rotated toward the rear glass (550), the controller 317 converts the room mirror 160 into the mirror mode (560).

When the engine of the vehicle 100 is turned on, and then the room mirror 160 is rotated toward the rear glass, the controller 317 may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

As another example, the controller 317 may be interlocked with the turning on of the engine of the vehicle 100, and may rotate the room mirror 160 toward the rear glass. The controller 317 may output the control signal for driving the motor of the room mirror 160 to rotate the room mirror 160 toward the rear glass of the vehicle 100. The controller 317 may rotate the room mirror 160 toward the rear glass, and may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

As still another example, when the driver inputs the command for rotating the room mirror 160 toward the rear glass through the input unit 303, the controller 317 may rotate the room mirror 160 toward the rear glass. The controller 317 may output the control signal for driving the motor of the room mirror 160 to rotate the room mirror 160 toward the rear glass of the vehicle 100 according to the rotating command input through the input unit 303. The controller 317 may rotate the room mirror 160 toward the rear glass, and may convert the room mirror 160 into the mirror mode. When the rotational direction of the room mirror 160 is directed toward the rear glass, and the rotational angle thereof is greater than the predetermined angle, the controller 317 may convert the room mirror 160 from the display mode into the mirror mode.

The vehicle and the control method thereof according to one embodiment of the present disclosure displays the images of various stickers or the like attached to the front glass through the room mirror providing the display mode, and thus a user can remove the various stickers or the like which are attached to the front glass.

Therefore, it is possible to remove the obstacles which obstruct the user's field of vision by removing the stickers or the like attached on the front glass.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a room mirror provided to be rotatable and configured to provide at least one of a display mode for displaying a predetermined image and a mirror mode for reflecting incident light; and
a memory for storing an image capable of being displayed on the room mirror in the display mode; and
a controller configured to convert the mirror mode of the room mirror into the display mode and to display the image stored in the memory on the room mirror, when the room mirror is rotated toward a front glass at a predetermined angle or more.

2. The vehicle according to claim 1, further comprising a rear camera configured to obtain a rear image of the vehicle, wherein, when a shift lever of the vehicle is moved to an R (reverse) position, the controller converts the mirror mode of the room mirror into the display mode, and displays the rear image of the vehicle obtained by the rear camera.

3. The vehicle according to claim 1, wherein, when an engine of the vehicle is turned off, the controller converts the display mode of the room mirror into the mirror mode.

4. The vehicle according to claim 1, wherein, when an engine of the vehicle is turned off and the room mirror is rotated toward the front glass, the controller converts the mirror mode of the room mirror into the display mode.

5. The vehicle according to claim 1, wherein, when an engine of the vehicle is turned on and the room mirror is rotated toward a rear glass, the controller converts the display mode of the room mirror into the mirror mode.

6. The vehicle according to claim 1, further comprising an input unit for receiving an input of a command for rotating the room mirror toward the front glass or a rear glass.

7. The vehicle according to claim 1, further comprising a communicator for receiving an image transmitted from a wireless communication terminal,
wherein the memory stores an image received by the communicator.

8. The vehicle according to claim 1, wherein the room mirror is provided to be rotatable in a yaw direction.

9. The vehicle according to claim 1, wherein the controller converts the display mode of the room mirror into the mirror mode when the room mirror is rotated toward a rear glass at the predetermined angle or more.

10. The vehicle according to claim 1, wherein the room mirror comprises a motor for providing power so that the room mirror is rotated in a yaw direction.

11. A method of controlling a vehicle, comprising:
converting a mirror mode of a room mirror for reflecting incident light into a display mode and displaying a rear image of the vehicle on the room mirror by a controller when a shift lever is moved to an R (reverse) position;
converting the mirror mode of the room mirror into the display mode by the controller when the room mirror is rotated toward a front glass; and
displaying a predetermined image on the room mirror when the room mirror is converted into the display mode.

12. The method according to claim 11, further comprising rotating the room mirror toward a rear glass, when an engine of the vehicle is turned on; and converting the display mode of the room mirror into the mirror mode when the room mirror is rotated toward the rear glass.

13. The method according to claim 11, comprising determining whether the room mirror is rotated toward a rear glass at a predetermined angle or more, when an engine of the vehicle is turned on; and converting the display mode of the room mirror into the mirror mode when the room mirror is rotated at the predetermined angle or more.

14. The method according to claim 11, further comprising rotating the room mirror toward a rear glass when a command for rotating the room mirror toward the rear glass is input through an input unit; and converting the display mode of the room mirror into the mirror mode.

15. The method according to claim 11, further comprising rotating the room mirror toward the front glass when an engine of the vehicle is turned off; and converting the mirror mode of the room mirror into the display mode when the room mirror is rotated toward the front glass.

16. The method according to claim 11, comprising determining whether the room mirror is rotated toward the front glass at a predetermined angle or more when an engine of the vehicle is turned off; and converting the mirror mode of the room mirror into the display mode when the room mirror is rotated at the predetermined angle or more.

17. The method according to claim 11, further comprising rotating the room mirror toward the front glass, when a command for rotating the room mirror toward the front glass is input through an input unit; and converting the mirror mode of the room mirror into the display mode.

18. The method according to claim 11, wherein the step of converting of the room mirror into the display mode comprises converting the display mode of the room mirror into the mirror mode when an engine of the vehicle is turned off; and converting the mirror mode of the room mirror into the display mode when the room mirror is rotated toward the front glass.

19. The method according to claim 11, wherein the step of displaying the image comprises receiving an image transmitted from a wireless communication terminal; and displaying the received image on the room mirror which is converted into the display mode.

* * * * *